(12) United States Patent
Afgani

(10) Patent No.: US 10,523,319 B2
(45) Date of Patent: Dec. 31, 2019

(54) COLLISION AVOIDANCE METHOD AND SYSTEM FOR WIRELESS COMMUNICATION SYSTEMS

(71) Applicant: pureLiFi Limited, Edinburgh (GB)

(72) Inventor: Mostafa Afgani, Edinburgh (GB)

(73) Assignee: pureLiFi Limited, Edinburgh (GB)

( * ) Notice: Subject to any disclaimer, the term of this patent is extended or adjusted under 35 U.S.C. 154(b) by 0 days.

(21) Appl. No.: 15/756,348

(22) PCT Filed: Aug. 26, 2016

(86) PCT No.: PCT/GB2016/052666
§ 371 (c)(1),
(2) Date: Feb. 28, 2018

(87) PCT Pub. No.: WO2017/037437
PCT Pub. Date: Mar. 9, 2017

(65) Prior Publication Data
US 2018/0287701 A1    Oct. 4, 2018

(30) Foreign Application Priority Data

Aug. 28, 2015 (GB) .................................. 1515307.5

(51) Int. Cl.
*H04B 10/00* (2013.01)
*H04B 10/116* (2013.01)
(Continued)

(52) U.S. Cl.
CPC ...... *H04B 10/116* (2013.01); *H04W 74/0816* (2013.01)

(58) Field of Classification Search
CPC .............. H04B 10/114; H04B 10/1143; H04B 10/1149; H04B 10/116
See application file for complete search history.

(56) References Cited

U.S. PATENT DOCUMENTS 5,841,778 A    11/1998    Shaffer et al.
5,903,553 A    5/1999    Sakamoto et al.
(Continued)

OTHER PUBLICATIONS

Tobagi F. A. et al., "Packet switching in radio channels: Part II—The hidden terminal problem in carrier sense multiple-access and the busy-tone solution", IEEE Transactions on Communications, IEEE Service Center, Piscataway, NJ, vol. COM-23, No. 12, Dec. 1, 1975, pp. 1417-1433, XP000809419.
(Continued)

*Primary Examiner* — Daniel G Dobson
(74) *Attorney, Agent, or Firm* — Womble Bond Dickinson (US) LLP

(57) ABSTRACT

A collision avoidance method for a wireless network comprising a plurality of devices, the method comprises receiving, by a first device of the plurality of devices, a message from a second device of the plurality of devices, transmitting, by the first device, a busy signal in response to the receiving of at least part of the message from the second device, the transmitting of the busy signal being at least partly simultaneous with the receiving of the message, receiving, by at least one further device of the plurality of devices, the busy signal, and delaying, by the at least one further device and in response to the busy signal, transmission of at least one further message by the at least one further device.

18 Claims, 4 Drawing Sheets

(51) Int. Cl.
*H04W 74/08* (2009.01)
*H04J 14/00* (2006.01)

(56) References Cited

U.S. PATENT DOCUMENTS

| | | | |
|---|---|---|---|
| 5,940,400 | A | 8/1999 | Eastmond et al. |
| 6,539,028 | B1 | 3/2003 | Soh et al. |
| 8,743,823 | B2 | 6/2014 | Richardson et al. |
| 2005/0078958 | A1 | 4/2005 | Chae et al. |
| 2005/0180357 | A1 | 8/2005 | Tao |
| 2006/0104301 | A1 | 5/2006 | Beyer et al. |
| 2009/0219905 | A1 | 9/2009 | Khandekar et al. |
| 2009/0252144 | A1* | 10/2009 | Ji ............... H04W 74/0858 370/345 |
| 2014/0226977 | A1* | 8/2014 | Jovicic ............ H04B 10/116 398/26 |

OTHER PUBLICATIONS

C-P Wang J. et al., "A survey on control separation techniques in multi-radio multi-channel MAC protocols", Communications and Information Techonologies, 2007, ISCIT '07. International Symposium on, IEEE, PI, Oct. 1, 2007, pp. 854-859, XP031166580.

Wu C. et al., "Receiver-initiated busy-tone multiple access in packet radio networks", Frontiers in Computer Communications Technology, ACM, New York, NY, Aug. 1, 1987, pp. 336-342, XP058125523.

Ping Wang et al., "A new MAC scheme supporting voice/data traffic in wireless ad hoc networks", IEEE Transaction on Mobile Computing, IEEE Service Center, Los Alamitos, CA, vol. 7, No. 12, Dec. 1, 2008, pp. 1491-1503, XP011335300.

International Search Report dated Nov. 3, 2016 in International Application No. PCT/GB2016/052666.

Search Report dated Feb. 25, 2016 in corresponding application No. GB 1515307.5.

Salman et al., "IEEE Standard for Low-Rate Wireless Networks", IEEE, Jul. 2016, pp. 701-705.

"Part 3: Carrier sense multiple access with collision detection (CSMA/CD) access method and physical layer specifications", IEEE Computer Society, Dec. 2005, pp. 1-626.

Ghimire et al., "Self-organising interference coordination in optical wireless networks", Journal on Wireless Communications and Networking, 2012, pp. 1-15.

European Office Action dated Jun. 13, 2019 in European Patent Application No. 16 758 258.4.

\* cited by examiner

COLLISION AVOIDANCE METHOD AND SYSTEM FOR WIRELESS COMMUNICATION SYSTEMS

FIELD

The present invention relates to a collision avoidance method for wireless communications, for example a collision avoidance method for optical wireless communications.

BACKGROUND

It is known to provide optical wireless data communications by using visible light (or infrared or ultraviolet light) instead of radio frequencies to transmit and receive data wirelessly between devices. Data may be transmitted in visible light by modulating the intensity of the light. The light used may be coherent or incoherent. Optical wireless networks using visible light may in some circumstances allow a higher data capacity and greater energy efficiency than radio frequency wireless networks.

Carrier sensing multiple access with collision avoidance (CSMA/CA) is a technique that is employed in wireless communication standards such as 802.11 and 802.15.4 to allow sharing of a common transmission medium between multiple entities in a given network. The use of CSMA/CA may provide a mechanism for minimising the probability of simultaneous transmissions in the wireless channel. The occurrence of simultaneous transmissions by two or more devices may be called a collision. Such collisions may adversely affect the overall throughput of the system.

The basic operating principle for CSMA/CA may be described as follows.

At a first stage, before transmitting a message (for example, a frame) to a receiving node, a device that wishes to transmit senses the channel in order to determine whether the channel is free or busy. Sensing the channel may comprise any method of detecting whether any signal is currently being sent on that channel. The sensing of the channel may be performed using simple energy detection or using another method, for example using a more sophisticated signature detection mechanism.

At a next stage, if the device detects that the channel is busy, the device waits for a random back-off period and then senses the channel again to determine whether the channel is still busy. The channel may be busy if any other device (which may be the receiving node or any other node of the network) is currently transmitting using that channel.

At a further stage, if the device detects that the channel is free, the device commences transmission of its message. If the transmission of the message is successful, an acknowledgement (ACK) is sent by the receiving node to the device. If the device does not receive an ACK from the receiving node, the device waits for a random back-off interval and then senses the channel again to determine whether the channel is busy. If the channel is not busy, the device attempts to re-transmit the message.

A central premise of the CSMA/CA technique is that each node is able to sense the transmission of every other node in a given wireless network. Therefore, when a given device senses the channel on which it wishes to transmit, it can tell whether any other device is currently transmitting using that channel.

The CSMA/CA technique may be considered to be suited to the half-duplex nature of some radio-frequency (RF) wireless systems. In some radio-frequency (RF wireless systems), the same frequency is utilized for uplink and for downlink. Such wireless systems may operate in a half-duplex manner in which the same channel is used for transmitting and receiving. A node may either be receiving (for example, channel sensing) or transmitting. In a half-duplex RF wireless system a node may never be both transmitting and receiving at the same time.

A requirement of CSMA/CA may be that any given device can sense the channel across the whole system (i.e., can sense transmissions from any node in the network). In a real-world wireless network, the requirement of being able to sense the channel across the whole system may be difficult to satisfy due to the hidden node issue. The hidden node issue is illustrated in FIG. 1. The hidden node issue occurs when a first device in a network is unable to sense transmissions from a further device in the network. The first device may believe that the channel is free when in fact the further device is transmitting. Therefore, collisions may occur.

When the hidden node issue is present, additional measures may be required to be taken to promote collision-free channel access.

FIG. 1 is a schematic diagram which is illustrative of a wireless network comprising an access point (AP) 10 and two stations (STA) 12, 14. The wireless network of FIG. 1 is subject to the hidden node issue. Station 12 cannot sense transmissions from station 14, and station 14 cannot sense transmissions from station 12.

Circle 16 is representative of the transmission range of station 12. Station 14 is not within the transmission range of station 12 and so cannot sense transmissions from station 12.

Circle 18 is representative of the transmission range of station 14. Station 12 is not within the transmission range of station 14 and so cannot sense transmissions from station 14.

The access point 10 is within the transmission range of both stations. Standard CSMA/CA may not work in the wireless network illustrated in FIG. 1 because collisions may occur at the access point 10 when both stations 12, 14 attempt transmission simultaneously.

In the 802.11 standard, the distributed coordination function (DCF) protocol may address the hidden node issue. There are two methods for packet transmission in DCF.

The DCF protocol provides a first packet transmission method comprising a two-way handshaking mechanism (also called the basic access method). In the two-way handshaking mechanism, nodes utilise standard CSMA/CA without any regard for the hidden node issue. When utilizing the DCF protocol with two-way handshaking, receiving nodes transmit a positive acknowledgement (ACK) to signal a successful reception of a transmission.

The DCF protocol provides a second packet transmission method comprising a four-way handshaking mechanism (RTS/CTS) in which nodes must reserve the channel before any transmission. When using the four-way handshaking mechanism for transmission, any node wishing to access the channel must transmit a short ready-to-send (RTS) message to the intended receiver. If the RTS message is received successfully by the receiver, the receiver will transmit a clear-to-send (CTS) message to the node to indicate that the channel has been reserved. The RTS/CTS exchange is then followed by transmission of a data frame from the transmitting node to the receiver, and transmission of an ACK from the receiver to the transmitting node.

Although the four-way handshaking scheme may in some circumstances overcome the hidden node issue, the use of the four-way handshaking scheme may introduce a significant overhead. The time taken to send data may be increased by the requirement to send RTS and CTS messages. The use of the four-way handshaking scheme may lead to a reduction in the overall throughput of the system (for example, compared to a system that uses two-way handshaking).

In order to provide multiple access functionality in an optical wireless system, one may wish to utilise the DCF mechanism from the 802.11 standard. However, certain characteristics of some optical wireless nodes may prevent stations from sensing each other. If stations cannot sense each other, the basic access method (two-way handshaking) may be rendered inoperable. Only the four-way handshaking mechanism of 802.11 and not the two-way handshaking option may be used.

The characteristics of optical wireless nodes that may prevent stations from sensing each other may include directionality and/or wavelength division.

With regard to directionality, an optical wireless station (STA) may have a transmission cone with a half angle less than 90 degrees and/or a receiver field-of-view of less than 180 degrees. As a result, one optical wireless station may be unable to detect transmission from another optical wireless station, even if the optical wireless stations are placed side-by-side.

With regard to wavelength division, a given optical wireless transceiver may use a different wavelength of light for uplink than is used for downlink. For example, a STA may be equipped with an infrared emitter (for example, 850 nm) and a blue light receiver (for example, 460 nm). As a result, a given STA may not be able to detect a transmission from another STA even if the STAs are positioned face-to-face. Because all the STAs are configured to transmit on a first wavelength and receive on a second, different wavelength, a STA cannot receive another STA's transmission. A STA can only receive a transmission from a device that transmits on the second wavelength (for example, an AP), not a transmission from a device that transmits on the first wavelength.

SUMMARY

In a first aspect of the invention, there is provided collision detection method for a wireless network comprising a plurality of devices, the method comprising: receiving, by a first device of the plurality of devices, a message from a second device of the plurality of devices; transmitting, by the first device, a busy signal in response to the receiving of at least part of the message from the second device, optionally the transmitting of the busy signal being at least partly simultaneous with the receiving of the message; receiving, by at least one further device of the plurality of devices, the busy signal; and delaying, by the at least one further device and in response to the busy signal, transmission of at least one further message by the at least one further device.

By providing a busy signal, the first device indicates to further devices in the network that the channel on which the second device transmitted the message is busy. Further devices are therefore able to avoid sending messages when the channel is busy and collisions are avoided. In an optical wireless network, there may be a plurality of stations each of which is unable to sense the transmissions of other stations in the network. The provision of a busy signal by a device (for example, an access point) receiving a transmission from one of the stations means that other stations can avoid sending messages when the channel is busy.

Providing the busy signal may provide a way for stations to sense the transmissions of other stations as long as they can sense transmissions of an access point. This may allow the DCF basic access method to be used.

The wireless network may comprise an optical wireless network.

The message from the second device, received by the first device, may be on a first channel and the transmitting of the busy signal by the second device may be on a second, different channel.

The first channel and second channel may form a full duplex connection between the first device and second device.

The first channel may comprise a visible light downlink and the second channel may comprise an infrared uplink, or vice versa.

The busy signal may be transmitted in response to sensing of at least part of the message by a signal sensing component of the first device. The first device may comprise physical layer processing circuitry configured to decode the message and pass the message to at least one higher level of processing circuitry, and the signal sensing component may be a signal sensing component of the physical layer processing circuitry. The higher level processing circuitry may comprise a MAC layer.

Sensing the message in the physical layer may result in the busy signal being sent very quickly after at least part of the message is received.

The busy signal may be transmitted in response to processing of the message by the at least one higher level of processing circuitry. Transmitting the busy signal in response to processing of the message by the at least one higher level of processing circuitry may allow the busy signal to contain information obtained by processing at a higher level, for example, by processing at a MAC level. The information may include, for example, the length of the message or the rate at which the message is being transmitted.

The first device may comprise a switch that is triggered by the sensing of said at least part of the message by the signal sensing component. The triggering of the switch may cause the busy signal to be passed from a busy signal source of the first device to a transmitter of the first device for transmission.

The switch may be a part of the physical layer processing circuitry. The busy signal source may be configured to provide a pre-determined busy signal. The message may be sensed by the signal sensing component before being passed to a decoding component.

The triggering of the switch may cause transmission of data other than the busy signal by the first device to be disabled. The triggering of the switch may cause a modulating and coding component of the first device to be deactivated. The triggering of the switch may cause data from the modulating and coding component to be blocked.

The busy signal may be independent of the content of the message from the second device. The message may comprise a payload and the busy signal may not comprise any part of the message's payload. The busy signal may be independent of the nature of the transmission.

A busy signal that is independent of the content of the message may be provided very quickly. The busy signal may be transmitted as soon as the message is sensed by the signal sensing component. The busy signal may be transmitted before decoding of the message.

The sending of the busy signal may be independent of the decoding of the message. The signal sensing component may be before a decoding component in the physical layer processing circuitry. The message may be received by the signal sensing component before it is received by the decoding component.

The busy signal may be independent of which device of the plurality of devices transmitted the message. The busy signal may be a generic busy signal that does not depend on the device sending the message and/or the content of the message itself.

The busy signal may comprise data representative of at least one property of the message. The at least one property of the message may comprise one or more of a size of the message, a modulation type of the message, a coding rate of the message, a length of the message, a duration of the message.

The busy signal may be transmitted on a first channel and the message from the second device may be received on a second, different channel. The first channel may comprise a first wavelength and the second channel may comprise a second, different wavelength. The first channel may comprise one of visible light and infra-red light and the second channel may comprise the other of visible light and infra-red light.

The second device may be configured to receive messages on the first channel and to send messages on the second, different channel. The further device may be configured to receive messages on the first channel and to send messages on the second, different channel. The further device may be unable to receive messages on the second, different channel. The first device may be configured to send messages on the first channel and to receive messages on the second, different channel.

By providing a busy signal on the first channel, the first device may provide a busy signal that is capable of being received by the second device and/or further device. The further device may be unable to receive the message sent by the second device. By receiving the busy signal from the first device, the further device is able to determine that the second channel is busy, even though the further device cannot receive messages on the second channel.

The transmitting of the busy signal in response to the receiving of at least part of the message may comprise beginning to transmit the busy signal before completion of the receiving of the message.

At least part of the busy signal may be transmitted substantially simultaneously with at least part of the message.

The first device may begin to send the busy signal in response to the sensing of the start of the message. The sending of the busy signal may not depend on decoding of the message.

Transmitting the busy signal in response to the message may comprise transmitting the busy signal until completion of the receiving of the message. The transmission of the busy signal may cease in response to the completion of the receiving of the message.

The transmitting of the busy signal in response to the message may cease before completion of the receiving of the message. A channel free signal may be sent in response to the completion of the receiving of the message.

The delaying of the transmission of at least one further message by the at least one further device may comprise, for the or each further device, delaying a respective message by a respective random time interval in response to the receiving of the busy signal.

The method may further comprise receiving, by the second device, the busy signal, wherein the busy signal is received before transmission of the message from the second device is completed; and continuing, by the second device, transmission of the message on receiving of the busy signal.

The second device may assume that the busy signal is sent in response to its message. The second device may continue to transmit even once it has received the busy signal.

A time between commencing transmission of the message by the second device and commencing receiving of the message by the first device may comprise a propagation delay. The propagation delay may correspond to a distance between the first device and second device. The propagation delay may be less than 100 ns, optionally less than 10 ns, optionally between 1 ns and 10 ns. The propagation delay may be shorter than a time interval over which the message is received. The short propagation delay may result in a short contention time. There may be a short contention time between the message being sent by the second device and the busy signal being received by the at least one further device. A short contention time may reduce a risk of collisions.

A time between commencing receiving of the message by the first device and the transmitting of the busy signal may comprise a processing delay. The processing delay may be less than 10 μs, optionally less than 1 μs, further optionally between 10 ns and 1 μs. The processing delay may comprise a delay during which the message is processed by physical layer processing circuitry of the first device.

A time between the receiving of the message by the first device and the sending of the busy signal may further comprise a further processing period in which the message is processed at a layer of the first device that is higher than the physical layer.

The message may comprise a physical layer frame.

In a further aspect of the invention, which may be provided independently, there is provided a wireless communication system comprising a plurality of devices, wherein the plurality of devices comprises: a first device configured to receive a message from a second device and to transmit a busy signal in response to the receiving of at least part of the message from the second device wherein optionally the transmitting of the busy signal is at least partly simultaneous with the receiving of the message; the second device configured to transmit the message to the first device; and at least one further device configured to receive the busy signal and, in response to the receiving of the busy signal, to delay transmission of at least one further message.

The wireless communication system may be configured to perform a method as claimed or described herein.

In a further aspect of the invention, which may be provided independently, there is provided a wireless transceiver device configured to receive a message from another device and to transmit a busy signal in response to the receiving of at least part of the message, optionally the transmitting of the busy signal being at least partly simultaneous with the receiving of the message.

The device may comprise a switch, a busy signal source, a transmitter, and a signal sensing component; wherein the signal sensing component is configured to sense the receiving of the message; the switch is configured to pass a busy signal from the busy signal source to the transmitter on detection of the receiving of the message by the signal sensing component; and the transmitter is configured to transmit the busy signal.

The signal sensing component may be part of physical layer processing circuitry of the device.

The device may further comprise a decoding component. The signal sensing component may be configured to pass the message to the decoding component and to pass to the switch a signal indicating the receiving of the message.

In a further aspect of the invention, which may be provided independently, there is provided a wireless transceiver device configured to transmit and/or receive over a first channel and to transmit and/or receive over a second channel, wherein the device is configured to receive a busy signal over the first channel and in response to a the busy signal to delay transmission of a message over the second channel.

There may also be provided an apparatus, system or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting examples, and are illustrated in the following figures, in which:—

Figure 1:
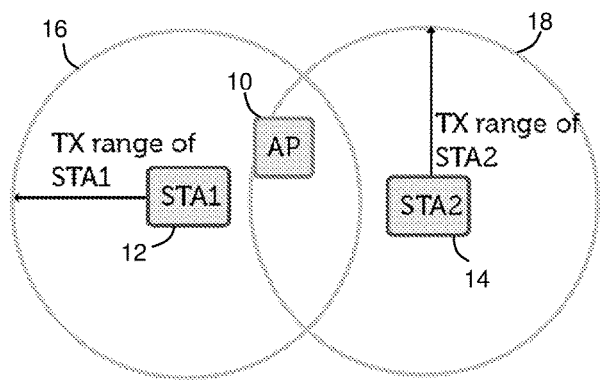
FIG. 1 is a schematic diagram of a wireless network.
Figure 2:
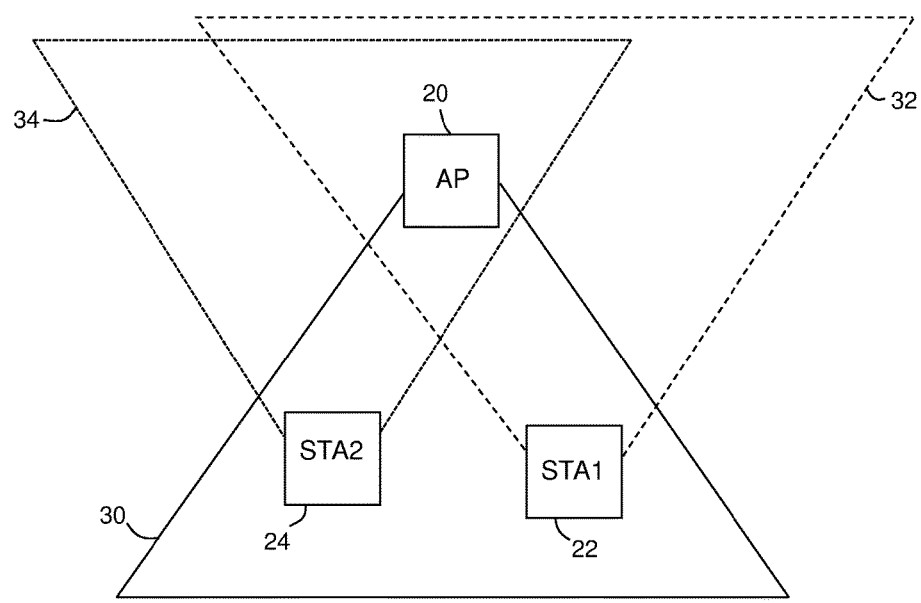
FIG. 2 is a schematic diagram of an optical wireless network comprising a single AP and two STAs.

FIG. 2 shows an embodiment of a simple optical wireless network in which one access point 20 (AP) may send data to and receive data from each of two stations 22 and 24 (STA1 and STA2). Although only two stations are shown in FIG. 2, in other embodiments any appropriate number of stations may be present in the optical wireless network. The optical wireless network may comprise multiple access points (APs), with each AP being optically connected to zero, one or more stations.

The access point 20 comprises a light source which may be used to send data by modulation of light. In the present embodiment, the light source is an LED lamp. In other embodiments, the light source may be any appropriate coherent or incoherent light source, for example a laser light source. The access point 20 also comprises a light detector (for example, a photodiode) that may be used to receive modulated light. The access point 20 is configured to decode the received light to obtain data. Each of the stations 22, 24 also comprises a light source 27a, 27b and a light detector 28a, 28b. Different devices (access point 20, station 22, station 24) may have the same or different types of light sources and/or light detectors.

In the present embodiment, downlink data (data sent from the access point 20 to one of the stations 22, 24) is sent using visible light. Uplink data (data sent from one of the stations 22, 24 to the access point 20) is sent using infrared light.

In other embodiments, any suitable frequency or frequencies of light (for example, including infrared, visible or ultraviolet light) may be used for the uplink and downlink. For example, any electromagnetic radiation with a wavelength between 10 nm and 2500 nm may be used, with different wavelengths being used for uplink and downlink.

Using different frequency bands (for example, visible and infrared) for uplink and downlink may allow for full duplex operation. Any one of the access point 20 or stations 22, 24 may receive and transmit data simultaneously. For example, the access point may receive uplink data that is sent using infrared light while sending downlink data using visible light.

The AP 20 transmits visible light into transmission cone 30. Stations 22 and 24 are inside transmission cone 30 and are configured to receive visible light. Therefore stations 22 and 24 can receive transmissions from the AP 20.

Station 22 transmits infra-red light into transmission cone 32. It may be seen from FIG. 2 that AP 20 is inside transmission cone 32, but the other station 24 is not inside transmission cone 32. The AP 20 can receive transmissions from station 22 because it is inside transmission cone 32 and it is configured to receive infra-red light. The other station 24 cannot receive transmissions from station 22 because station 24 is not inside transmission cone 32 and because station 24 cannot receive infra-red light.

Station 24 transmits infra-red light into transmission cone 34. AP 20 is inside transmission cone 34. Station 22 is not inside transmission cone 34. The AP 20 can receive transmissions from station 24. Station 22 cannot receive transmissions from station 24 because station 22 is not inside transmission cone 34 and because station 22 cannot receive infra-red light.

In the embodiment of FIG. 2, the access point 20 is connected to a wired data link, for example to an Ethernet link (not shown). The stations 22, 24 may each be connected to or be part of a computer or other device (not shown). For example, each station may be connected to or form part of a mobile communications device such as a cellphone, laptop computer or tablet computer.

Figure 3:
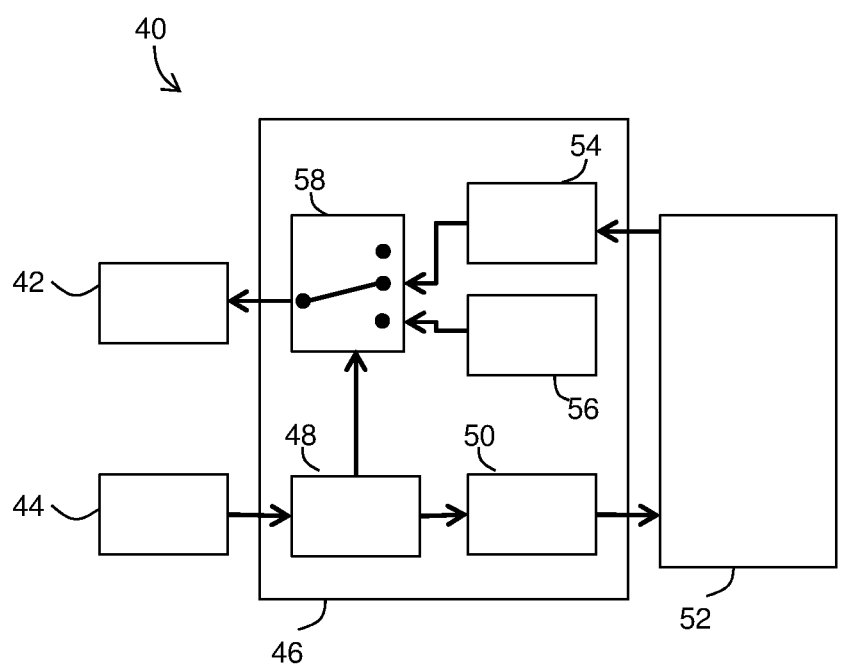
FIG. 3 is a schematic diagram that is representative of components of an optical wireless device.

FIG. 3 is a schematic diagram of an optical wireless transceiver device 40 according to an embodiment. The optical wireless transceiver device of FIG. 3 may be an access point (AP) or a station (STA). In the description below, the optical wireless transceiver device 40 is an AP. The AP is configured to receive infra-red and to transmit visible light. In other embodiments, the device is a STA and is configured to receive visible light and to transmit infra-red light.

The optical wireless transceiver device 40 comprises a transmitter front-end 42, receiver front-end 44, physical layer 46 and upper layer or layers 52. The transmitter front-end 42 and receiver front-end 44 transmit and receive signals as modulated light.

The physical layer 46 of the transceiver 40 processes signals at the PHY layer (layer 1). The upper layer or layers 52 process signals at a higher layer or layers, for example the MAC layer, stack etc.

Any suitable system architecture and communication protocols may be used. For example, in some embodiments the optical wireless transceiver device 40 and other components of the system may be configured to be compatible with, or operate according to, the 802.11 standard or a variant of that standard. Any other suitable communication protocols may be used in other embodiments.

The transmitter front-end 42 is configured to receive an electronic signal representative of a PHY layer frame from the physical layer 46 of the optical transceiver 40, to convert the electronic signal into modulated visible light, and to transmit the modulated visible light to one or more STAs. The transmitter front-end 42 comprises an LED lamp (not shown) operating at a visible wavelength, and may also comprise other components (not shown), for example one or more filters and/or one or more amplifiers.

In at least some embodiments, the transmitter front-end comprises signal conversion component(s) (e.g. one or more digital to analogue converters), signal and power conditioning circuitry, amplifier circuitry, filters (electrical and/or optical), LED driver and control circuitry, and at least one LED luminaire.

The receiver front-end 44 is configured to receive modulated infra-red light from one or more STAs, to convert the modulated infra-red light into an electronic signal, and to pass the resulting electronic signal to the physical layer 46 of the optical transceiver 40. The receiver front-end 44 comprises a photodiode (not shown) operating at an infra-red wavelength and may also comprise other components (not shown), for example one or more filters and/or one or more amplifiers.

In at least some embodiments, the receiver front-end comprises a photodetector device, an optical concentrator (e.g. a lens arrangement), amplifier circuits (trans-impedance or otherwise), gain control circuits, signal and power conditioning components, filters (electrical and/or optical), and signal conversion component(s) (e.g. one or more analogue to digital converters).

Unlike most RF wireless devices (for example, unlike wireless devices configured to use the 802.11 standard), optical wireless transceiver devices such as the device shown in FIG. 3 are equipped with front-ends (FE) that support full duplex operation. Distinct electrical devices are used for transmission and for reception. For example, an LED may be used for transmission and a photoreceiver may be used for reception. This may be contrasted with some RF wireless devices in which a single antenna is used for both transmission and reception. In the embodiment shown in FIG. 3, the distinct transmission and reception devices also operate at different wavelengths.

Physical layer 46 comprises a signal sensing component 48, demodulating and decoding component 50, modulating and encoding component 54, busy signal generator 56 and switch 58.

In operation, receiver front-end 44 converts received modulated light into an electronic signal, and passes the electronic signal to the signal sensing component 48. The signal sensing component 48 is configured to detect whether a signal is being received by the receiver front-end 44. For example, the signal sensing component 48 may be configured to determine whether an amplitude of a received signal is above an amplitude level which may be expected from noise. The signal sensing component 48 may be configured to determine whether an amplitude of the received signal is above a threshold amplitude level for a specified time interval.

The detection of the signal may comprise energy detection. In the present embodiment, signal sensing is performed using the method of energy detection for speed and simplicity. If a power level above a given threshold is received in the band of interest, a signal is assumed to be present. In other embodiments, other spectrum or signal sensing methods may be used, for example matched filter detection or cyclostationary feature detection.

Signal sensing component 48 passes a signal to switch 58. The signal that the signal sensing component 48 passes to switch 58 is indicative of whether a signal has been detected by signal sensing component 48.

The signal sensing component 48 passes the electronic signal that it received from the receiver front-end 44 to the demodulating and decoding component 50. The demodulating and decoding component 50 demodulates and decodes the electronic signal. The decoded signal is passed to other layers 52 of the transceiver 46.

In some embodiments, the signal sensing component 48 and the demodulating and decoding component 50 receive the electronic signal from the receiver front-end 44 in parallel. However, if the signal sensing component 48 receives the electronic signal before the demodulating and decoding component 50 it may be possible to avoid operating the demodulating and decoding component 50 when no signal is present.

Power savings may be obtained by not running the demodulating and decoding component 50 when no signal is present.

The modulating and coding component 54 is configured to modulate and encode a signal sent from the upper layers 52. The modulating and coding component converts upper layer signals into an electronic signal suitable to be sent to the transmitter front-end.

The busy signal generator 56 is configured to generate a busy signal. Switch 58 is configured to send either the busy signal from the busy signal generator 56 or modulated data from the modulating and encoding component 54 to the transmitter front-end 42.

If the signal sensing component 48 has sent a signal to the switch 58 that indicates that a signal is being received by the receiver front-end 44, the switch 58 blocks any modulated data from the modulating and coding component 54 and passes a busy signal from the busy signal generator 56 to the transmitter front-end 42 for transmission.

If the signal sensing component 48 has not sent a signal to the switch 58 that indicates that a signal is being received by the receiver front-end 44 (or if the signal sensing component 48 has sent a signal to the switch that positively indicates that no signal is being received by the receiver front-end 44), the switch 58 allows modulated data through. The switch 58 passes modulated data from the modulating and coding component 54 to the transmitter front-end 42 for transmission.

Although FIG. 3 shows particular components (for example, transmitter front-end 42, receiver front-end 44, signal sensing component 48, demodulating and decoding component 50, modulating and coding component 54, busy signal generator 56 and switch 58) in other embodiments any components providing the same or similar functionality may be used. Components may be combined. Components may be located differently from the diagram of FIG. 3. For example, components that are in the physical layer 46 of FIG. 3 may in other embodiments be provided in one of the front-ends or in a higher layer. In some embodiments, the functionality of more than one component of FIG. 3 may be provided by a single component. In some embodiments, the functionality of a single component of FIG. 3 may be provided by two or more components. For example, instead of single demodulating and decoding component 50, in some embodiments a demodulating component and separate decoding component may be provided.

In the present embodiment, the optical wireless transceiver device 40 of FIG. 3 is an Access Point (AP). In operation, the AP receives a frame from a station, for example from STA1 or STA2. The frame is received by receiver front-end 44, converted into an electronic signal and passed to signal sensing component 48. As soon as the signal sensing component 48 starts to receive the frame, the signal sensing component 48 sends a signal to the switch indicating that reception is in progress. The switch 58 switches to a setting in which modulated data from the modulating and encoding component 54 is blocked and a medium busy signal from the busy signal generator 56 is passed to the transmitter front-end 42 for transmission. The medium busy signal is transmitted by the transmitter front-end 42 and received by stations STA1 and STA2.

In another embodiment, the optical wireless transceiver device 40 of FIG. 3 is a station. The transmitter front-end 42 is configured to transmit infra-red light and the receiver front-end 44 is configured to receive visible light. In operation, the station receives a frame from an Access Point. The frame comprises a data payload. The frame is received by receiver front-end 44, converted into an electronic signal and passes to signal sensing component 48. As soon as the signal sensing component 48 of the station starts to receive the frame, the signal sensing component 48 sends a signal to the switch 58 indicating that reception is in progress. The switch 58 switches to a setting in which modulated data from the modulating and encoding component 54 is blocked, and a medium busy signal from the busy signal generator 56 is passed to the transmitter front-end 42 for transmission. The medium busy signal is transmitted by the transmitter front-end 42 and received by the access point.

Figure 4:
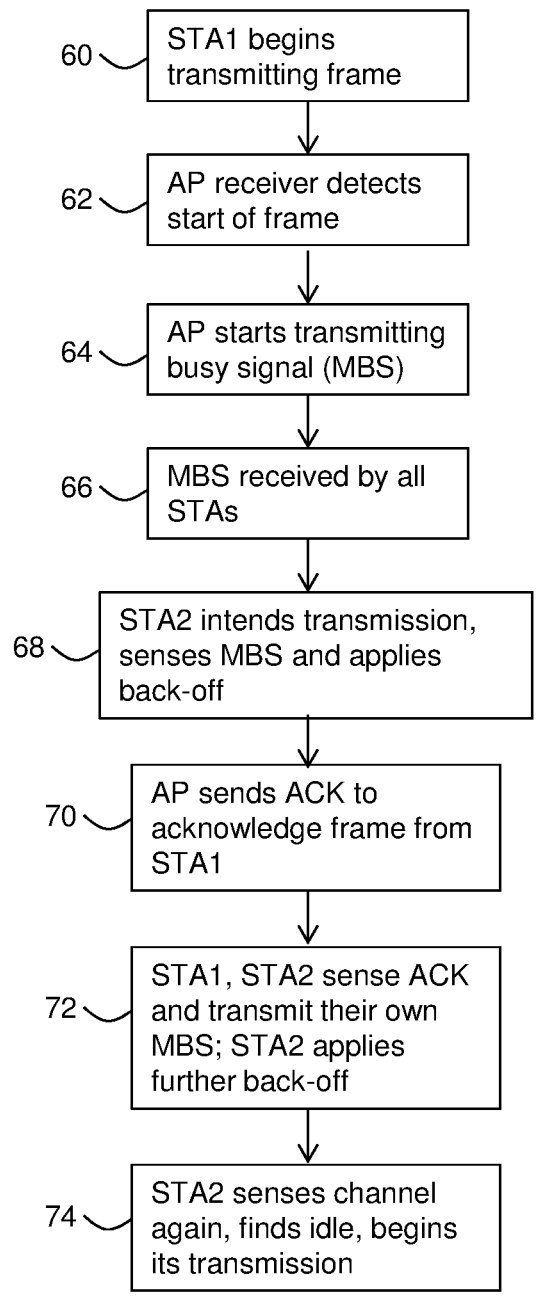
FIG. 4 is a flowchart which schematically illustrates a method of an embodiment.

FIG. 4 is a flow-chart illustrating an example of transmission and reception of frames in accordance with an embodiment. In the embodiment of FIG. 4, the AP, STA1 and STA2 are all optical wireless transceiver devices equipped with full-duplex front ends (for example, optical wireless devices similar to those shown in FIG. 3), each having appropriate transmission and reception wavelengths.

At stage 60, the transmitter front-end of STA1 begins transmitting an uplink frame after determining that the channel is free. A method of determining that a channel is free is described below with reference to stages 68 to 74.

At stage 62, the AP receiver front-end receives the start of the transmitted frame and the AP receiver detects the start of the frame. In the present embodiment, the signal sensing component detects the start of the frame. The mechanism used by the signal sensing component for detecting the start of the frame is energy detection. The system continuously observes the electronic signal received from the receiver front-end over a defined time window (for example, 500 ns). The time window used may depend on the expected signalling rate. If the received power exceeds a pre-determined threshold, a signal is assumed to be present. In other embodiments, any mechanism may be used for detecting the start of the frame.

A time between the transmitter front-end of STA1 starting to transmit the frame and the receiver front-end of the AP starting to receive the frame may be called the propagation time or propagation delay. The propagation time may be the time that it takes the signal to travel from STA1 to the AP. In an optical wireless network, the propagation time may be much shorter than the frame duration. In the present embodiment, the time delay between STA1 starting to send the frame and the AP starting to receive the frame is very small.

At stage 64, as soon as the signal sensing component of the AP detects the start of the frame (which may be described as frame detection being triggered), the AP sets the position of the AP switch to the busy signal generator. The AP switch passes a predetermined medium busy signal (MBS) from the busy signal generator to the transmitter front-end of the AP. The transmitter front-end of the AP starts simultaneously transmitting the medium busy signal (MBS) while still receiving the frame from STA1.

The frame is sensed by the signal sensing component of the AP before the frame is demodulated and decoded by the demodulating and decoding component of the AP. Therefore, the busy signal may be triggered before decoding of the frame. The sending of the busy signal does not depend on the decoding of the message.

In the present embodiment, the busy signal does not depend on the contents of the frame, so it is not necessary for any of the frame to be decoded before starting to send the busy signal. The busy signal does not depend on the payload of the frame. The busy signal is a predetermined busy signal that is stored and/or locally generated at the busy signal generator (which may be described as a busy signal source). The transmission of the busy signal is triggered by the frame being sensed by the signal sensing component, causing the switch to switch to the busy signal generator.

The full duplex nature of the transmitter and receiver front-ends of the AP is exploited to transmit the medium busy signal at the same time as receiving the frame from STA1. The MBS is generated and transmitted by the AP as soon as a first part of the uplink frame is received and without waiting for the entire uplink frame to be received and decoded.

In the present embodiment, the AP transmits an MBS for as long as the AP is receiving the frame. In other embodiments, the MBS may be transmitted for a shorter time than the length of time required to receive the frame, or for a longer time than the length of time required to receive the frame.

In one embodiment, the AP transmits a short MBS when the AP starts to receive the frame, but stops transmitting the MBS before all of the frame is received. In response to the receiving of the frame being completed, the AP transmits a channel free signal. The MBS indicates to the stations that the channel has become busy, and the channel free signal indicates to the stations that the channel has become free again.

In some embodiments, the channel free signal may be simple. For example, the channel free signal may comprise a predefined pattern. In other embodiments, the channel free signal may be more complex. The channel free signal may comprise scheduling parameters, for example expected free time, channel access order or banned STA lists. The channel free signal may comprise system parameters, for example network ID or MAC address.

In another embodiment the AP transmits a short MBS when the AP starts to receive the frame, but stops transmitting the MBS before all of the frame is received. The MBS contains information about the length of the frame being received and/or the rate at which the frame is being received. On receiving the MBS, the stations determine from the information in the MBS a length of time for which the channel is expected to be busy.

At stage 66, the MBS is received by all stations in the network (in this example, the MBS is received by STA1 and STA2). All stations are capable of receiving the MBS, since all stations in the network must be within the transmission range of the AP in order to remain associated with the AP and all stations are configured to receive the visible light that is transmitted by the AP.

For each station, the MBS is received by the station's receiver front-end. The signal sensing component of the station detects that a signal is being transmitted. If a station that receives the MBS is not itself transmitting, it may delay any intended transmission as described below with reference to stage 68 of FIG. 4.

The MBS is received by STA1 (which transmitted the frame) as well as by other stations. STA1 continues to transmit the frame even once it receives the MBS. Since STA1 already has a transmission in progress, it assumes that the MBS is generated by its ongoing transmission and not by another station. STA1 may be considered to ignore the MBS when the transmission of a frame by STA1 started before the MBS is received by STA1. In the present embodiment, STA1 does not compare the MBS to the message that was sent by STA1. STA1 ignores the MBS regardless of the content of the MBS.

Since the propagation time in an optical wireless network is very small, the time delay between STA1's frame transmission and the receiving of the MBS by the stations is very small.

The contention period for the network may be the time between the start of transmission of a frame by a first station, and the sensing of the MBS by another station. The contention period may include the time taken for the transmission of a frame from the station to be received (the propagation time), the time taken for the MBS to be generated and transmitted (the processing time), and the time taken for the MBS from the AP to be received by a station (another propagation time). During the contention period, another station sensing the channel would not yet be able to tell that the channel is busy even though the first station has started to transmit.

In the optical wireless network of the present embodiment, the contention period is very short. The probability of collision during the contention period is very small.

At stage 68, STA2 wishes to transmit a frame. The STA1 transmission is still in progress and an MBS is being generated by the AP. Before transmitting, STA2 senses the channel. On detecting the MBS, STA2 immediately disables its transmitter front-end. STA2 applies a random back-off time interval before attempting the transmission again.

The location within the station architecture where the MBS is processed by the station, STA1 in this case, may depend on the complexity of the MBS. For a simple, predefined signal the processing may be performed close to, or even at, the received front-end to ensure a tight and/or rapid control loop. For more complex signals, the MBS may need to be decoded/demodulated by higher layers of the station architecture.

In general, if a station detects a MBS from the AP, the action taken by the station depends on whether the station is currently transmitting. If the station is currently transmitting when it receives the MBS (as in the case of STA1), the station assumes that the MBS relates to its transmission, and the station continues to transmit. If the station is not yet transmitting when it receives the MBS, the station disables its front-end until it has sensed the channel again and found the channel to be free.

At stage 70, the reception of the frame from STA1 by the AP is complete. STA1 has transmitted the frame successfully. The AP transmits an ACK to acknowledge the reception of the frame from STA1. The AP may perform channel sensing before transmitting.

Optionally, at stage 72, STA2 senses the channel again. On sensing the channel, STA2 finds that the ACK of stage 70 is being transmitted by the AP. Optionally, on sensing the data transmission by the AP (the transmission of the ACK), STA2 sets its switch to transmit a medium busy signal (MBS). STA2 applies a further random back-off time interval. In embodiments in which STA2 is configured so that energy detection is always running, STA2 would generate the MBS as soon as the ACK from the AP reaches it, regardless of whether it wishes to sense the channel prior to transmission or not.

STA1 also receives the ACK from the AP. When STA1 starts to receive the ACK from the AP, STA1 optionally also sets its switch to transmit an MBS.

The AP ignores the MBSs that are sent by STA1 and STA2 since it already has a transmission in progress (the ACK of stage 70).

At stage 74, the further random back-off time interval that STA2 has applied at stage 72 expires. STA2 senses the channel once more. If the channel is found to be idle (i.e. the channel is free, with no data and no MBS is being transmitted by the AP), STA2 initiates frame transmission.

Sending an MBS as soon as a frame starts to be received may provide an effective method for enabling channel sensing (CSMA/CA) in optical wireless networks. In optical wireless networks, STAs may not be able to sense transmissions from other STAs. If the AP sends an MBS whenever it is receiving a frame from a STA, other STAs can tell that the channel is busy and can delay transmitting. Collisions due to the hidden node issue may thereby be avoided.

Sending an MBS when a message is received may allow multiple access using the two-way handshake technique, which may be more efficient than the four-way handshake technique.

The method of FIG. 4 may enable rapid channel sensing in optical wireless networks, which may permit the use of the efficient two-way handshake mechanism of the DCF algorithm. Unlike the standard method utilised in 802.11, the method of FIG. 4 may enable the basic access method to be used exclusively in the network with substantially reduced risk of collisions due to hidden nodes.

The method of FIG. 4 exploits the full duplex nature of the AP and the STAs. Each device can send and receive at the same time. Therefore, a device can, for example, send an MBS while also receiving data. In the device of FIG. 3, the physical layer of an optical transceiver is modified with respect to a previously-known transceiver to exploit the full-duplex front end for simultaneous transmission and reception even when operating with a half-duplex higher layer protocol stack (in this case, 802.11). Even though the 802.11 protocol is half-duplex, using the duplex nature of the transceiver to send an MBS when receiving allows the 802.11 protocol to be used more efficiently in an optical system in which stations cannot sense each other directly.

For simplicity, the method of FIG. 4 has been described in relation to a network with only two stations. However, in embodiments, any number of stations and APs may be present. There may be many stations each attempting to send data to an AP. Each station may go through the process of sensing the channel and detecting the MBS. Since each station applies a random back-off time interval before sensing the channel again (and the random back-off time interval applied by a given station should be different from the random back-off time interval applied by other stations), the stations should attempt transmission again at different times. The different back-off times and short contention period may mean that collisions of transmissions from different stations are extremely unlikely.

In the embodiment of FIG. 4, the MBS is transmitted continuously while a frame is being received. In other embodiments, the MBS is not transmitted throughout the whole receiving of the frame. For example, in some embodiments, a brief MBS message is transmitted on detection of the start of the frame to indicate the channel reservation. In some embodiments, a channel free signal is sent by the AP when the receiving of the message finishes, i.e. when the channel becomes free.

The MBS messages can be of different levels of complexity in different embodiments. For example, in some embodiments the MBS message comprises a short header identifying the message as an MBS, and a short payload indicating the duration of the transmission in progress. In other embodiments, the MBS message may also contain one or more of an identifier (ID) of the unit currently occupying the channel, an ID of the MBS generating unit, a priority/importance associated with the ongoing transmission (e.g. to allow interruption by other STAs for higher priority traffic). It is expected that such MBS messages would be short relative to a data frame, for example 1% to 2% of the duration of a typical data frame.

In the embodiment of FIG. 4, when the STA receives an MBS from the AP, and the STA is not currently transmitting, the STA disables its transmitter front-end. When the STA receives any other message from the AP (for example, an ACK, data packets, or any other message) it transmits a medium busy signal.

In some embodiments, when the STA receives an MBS from the AP, and the STA is not currently transmitting, the STA disables its transmitter front-end. When the STA receives any other message from the AP (for example, an ACK, data packets, or any other message) it disables its transmitter front-end. In some such embodiments, no MBS is implemented in the STA.

In the embodiment of FIG. 2, the AP includes a busy signal generator and switch and each of the STAs includes a respective busy signal generator and switch. In alternative embodiments, only the AP implements the busy signal generator. Each STA does not include the busy signal generator and switch of FIG. 3. A STA does not send a busy signal when it is receiving data from the AP.

It may still be possible for collision to be avoided even if only the AP is configured to transmit an MBS when it is receiving data. In an embodiment, multiple stations are capable of transmitting to the AP. When the AP receives data, it transmits an MBS. The MBS warns the stations that one of the stations is transmitting. If in the embodiment only one device (the AP) is capable of transmitting to the stations, it may not be necessary for the stations to transmit an MBS when they are receiving a transmission from the AP. The AP knows when it is transmitting data to the stations. When the AP is transmitting data to the stations, no other device is capable of transmitting data to the stations. None of the stations will transmit when receiving data from the AP, and even if they did so they would use a different wavelength. Therefore, no collision may occur when the AP is transmitting data to the stations.

In some embodiments, multiple devices each send a respective MBS (for example, each of two STAs sends a respective MBS). In some such embodiments, the same MBS content is sent by each device. For example, the MBS may be a generic MBS that does not depend on the content of the message. The MBS may not depend on which device is sending it.

In other such embodiments, the content of the MBS may be different for each embodiment. In some embodiments, the MBS identifies the device by which it is being transmitted.

In some embodiments, the MBS is a simple signal with minimal content. In other embodiments, the MBS is a more complex data frame. In some embodiments, the MBS may be a highly complex data frame carrying additional data. In some embodiments, additional data may be carried in the header of a complex MBS frame or in the payload of the complex MBS frame. Since the header would be decoded before the payload, carrying additional information in the header may be preferred for timing reasons. The MBS may contain data representative of at least one property of the message. For example, the MBS may contain data about the size of the message and/or a rate at which the message is being transmitted.

In the embodiment shown in FIG. 3, the MBS is implemented in the last stage of the physical layer. In other embodiments, the MBS may be implemented in the front-end, for example to reduce processing time further. In further embodiments, the MBS may be implemented in one of the higher protocol layers. Implementing the MBS in the higher layers may result in greater complexity than implementing the MBS in the physical layer or the front end. Implementing the MBS in the higher layers may have latency consequences.

In the embodiment of FIGS. 3 and 4, the MBS is sent in response to sensing of the message in the physical layer. In other embodiments, the MBS is sent in response to processing of the message at a higher layer, for example the MAC layer.

If the MBS is sent in response to processing by a higher layer rather than by the physical layer, there may be a longer time interval between a device receiving a transmitted signal and that device transmitting an MBS than in embodiments in which channel sensing is performed by the physical layer or the front-end. There may therefore be a longer contention period.

If the MBS is sent in response to processing by a higher level, it may be possible to obtain more information about a detected signal before sending an MBS than in the case in which the channel is sensed at the physical layer. The additional information may enable a more complex MBS to be transmitted. The more complex MBS may convey the additional information to the device receiving the MBS.

The sending of an MBS at a higher level, after obtaining more information about a detected signal, may result in a reduction of false positives. A false positive may occur if the energy detector incorrectly classifies noise as a signal. The classification of the noise as a signal may trigger the MBS, which could block out the channel for an indefinite period of time, making it unavailable to other devices. High layer processing may eliminate at least some false positives by validating the incoming signal before generating the MBS.

Figure 5:
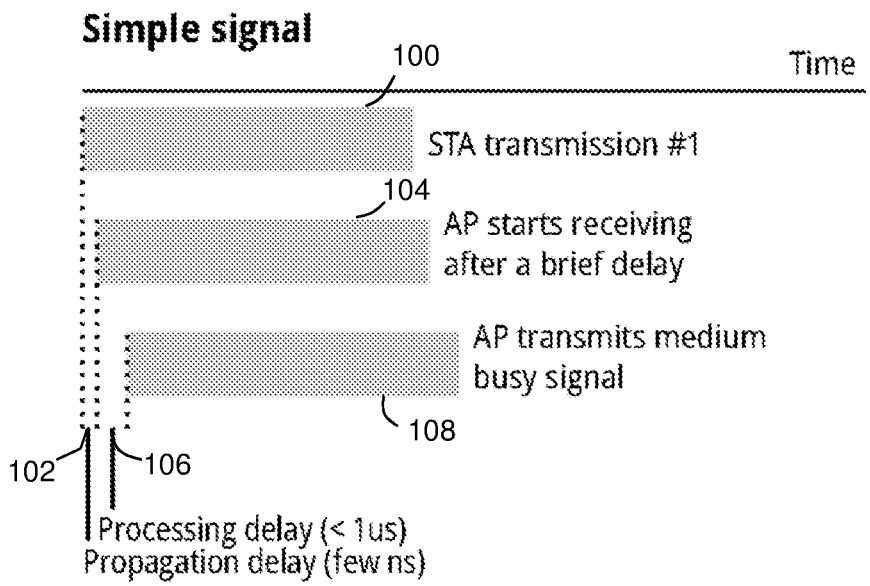
FIG. 5 is a schematic diagram showing timings for a medium busy signal.
Figure 6:
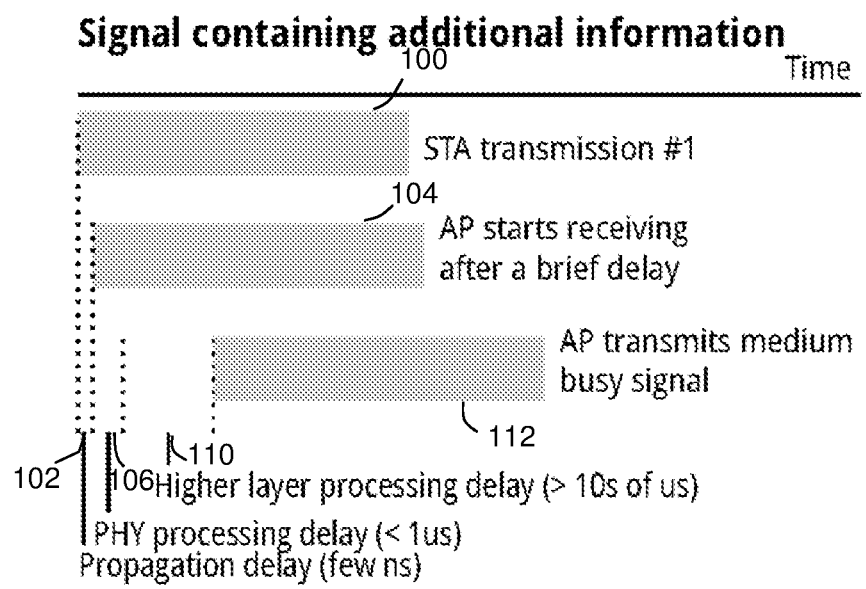
FIG. 6 is a schematic diagram showing timings for a medium busy signal containing additional information.

FIGS. 5 and 6 are timing diagrams that are representative of timing for two different medium busy signals.

FIG. 5 represents the transmission of a simple medium busy signal. Block 100 represents the transmission of a frame from STA1. After STA1 starts transmitting the frame, there is a propagation delay 102 before the AP starts to receive the frame. The reception of the frame by the AP is represented by block 104. The propagation delay may be a few nanoseconds.

After the AP starts to receive the frame (block 104) there is a processing delay 106 before the AP transmits the medium busy signal. The processing delay 106 may be less than 1 microsecond, and may include a digitisation delay that depends on the signalling rate but may be around 50 ns in some embodiments. The processing delay 106 represents the time needed to start to process the frame at the physical layer, including the digitisation latency, and to generate the medium busy signal. The processing is carried out at the physical layer, so the processing delay 106 may be comparatively short (for example, less than 1 microsecond).

The total delay between STA1 starting to transmit the frame and the AP starting to transmit the medium busy signal comprises the propagation delay 102 plus the processing delay 106. The transmission of the medium busy signal is represented by block 108.

FIG. 6 represents the transmission of a more complex medium busy signal which requires processing at a higher layer. Blocks 100, 102, 104 and 106 are the same as in FIG. 5. There is a small (nanoseconds) propagation delay 102 between the transmission of the frame by the STA (block 100) and the receiving of the frame (block 104). Then there is a physical layer processing delay 106 of less than 1 microsecond.

However, in the embodiment of FIG. 6, the medium busy signal is sent from the physical layer to a higher layer for processing and incurs a higher level processing delay 110 in addition to the propagation delay 102 and physical layer processing delay 106. The higher level processing delay may be 10s of microseconds.

The AP starts to transmit the MBS after a total delay comprising the propagation delay 102, physical layer processing delay 104 and higher level processing delay 106. The total delay may be 10s of microseconds. The total delay is greater than the total delay of FIG. 5.

Although particular delays are illustrated in FIGS. 5 and 6, there may also be other delays relating to further processing stages and/or components.

Although embodiments have been described that include optical wireless networks, any other suitable wireless networks may be used in other embodiments. For example, embodiments may comprise or be implemented on r.f. wireless networks, microwave wireless networks, or wireless networks in which messages are transmitted and/or received using any other suitable frequency of electromagnetic radiation.

Although embodiments have been described which include a visible light downlink and an infrared uplink, any other suitable frequency of electromagnetic radiation may be used for the downlinks and uplinks. For example, in the case of optical wireless embodiments, UV light may be used as well as or instead of either visible or infrared light, by using suitable LEDs or other light sources.

Whilst some of the components of the embodiments described herein may be implemented in software, it will be understood that any such components may be implemented in hardware, for example in the form of ASICs or FPGAs, or in a combination of hardware and software. Similarly, some or all of the hardware components of embodiments described herein may be implemented in software or in a suitable combination of software and hardware.

It will be understood that the present invention has been described above purely by way of example, and modifications of detail can be made within the scope of the invention. Each feature disclosed in the description, and (where appropriate) the claims and drawings may be provided independently or in any appropriate combination.

The invention claimed is:

1. A collision avoidance method for a wireless network comprising a plurality of devices, the method comprising:
   receiving, by a first device of the plurality of devices, a message from a second device of the plurality of devices;
   transmitting, by the first device, a busy signal in response to the receiving of at least part of the message from the second device, the transmitting of the busy signal being at least partly simultaneous with the receiving of the message;
   receiving, by at least one further device of the plurality of devices, the busy signal; and
   delaying, by the at least one further device and in response to the busy signal, transmission of at least one further message by the at least one further device,
   wherein the busy signal is transmitted in response to sensing of at least part of the message by a signal sensing component of the first device, and
   wherein the first device comprises physical layer processing circuitry configured to decode the message and pass the message to at least one higher level of processing circuitry, and the signal sensing component is a signal sensing component of the physical layer processing circuitry.

2. A method according to claim 1, wherein the wireless network comprises an optical wireless network.

3. A method according to claim 1, wherein the message from the second device, received by the first device, is on a first channel and the transmitting of the busy signal by the first device is on a second, different channel.

4. A method according to claim 3, wherein the first channel and second channel form a full duplex connection between the first device and second device.

5. A method according to claim 3, wherein one of the first channel and second channel comprises a visible light downlink and the other of the first channel and second channel comprises an infrared uplink.

6. A method according to claim 1, wherein the busy signal is independent of the content of the message from the second device.

7. A method according to claim 1, wherein the message comprises a payload and the busy signal does not comprise any part of the message's payload.

8. A method according to claim 1, wherein the sending of the busy signal is independent of the decoding of the message.

9. A method according to claim 1, wherein the busy signal comprises data representative of at least one property of the message.

10. A method according to claim 1, wherein the transmitting of the busy signal in response to the receiving of at least part of the message comprises beginning to transmit the busy signal before completion of the receiving of the message.

11. A method according to claim 1, wherein the delaying of the transmission of at least one further message by the at least one further device comprises, for the or each further device, delaying a respective message by a respective random time interval in response to the receiving of the busy signal.

12. A method according to claim 1, wherein the message comprises a physical layer frame.

13. A collision avoidance method for a wireless network comprising a plurality of devices, the method comprising:
   receiving, by a first device of the plurality of devices, a message from a second device of the plurality of devices;
   transmitting, by the first device, a busy signal in response to the receiving of at least part of the message from the second device, the transmitting of the busy signal being at least partly simultaneous with the receiving of the message;
   receiving, by at least one further device of the plurality of devices, the busy signal; and
   delaying, by the at least one further device and in response to the busy signal, transmission of at least one further message by the at least one further device,
   wherein the busy signal is transmitted in response to sensing of at least part of the message by a signal sensing component of the first device, and
   wherein the first device comprises a switch that is triggered by the sensing of said at least part of the message by the signal sensing component, and wherein the triggering of the switch causes the busy signal to be passed from a busy signal source of the first device to a transmitter of the first device for transmission.

14. A method according to claim 13, wherein the triggering of the switch causes transmission of data other than the busy signal by the first device to be disabled.

15. A wireless transceiver device configured to receive a message from another device and to transmit a busy signal in response to the receiving of at least part of the message, the transmitting of the busy signal being at least partly simultaneous with the receiving of the message, the wireless transceiver device comprising a switch, a busy signal source, a transmitter, and a signal sensing component;

wherein the signal sensing component is configured to sense the receiving of the message;

the switch is configured to pass a busy signal from the busy signal source to the transmitter on detection of the receiving of the message by the signal sensing component; and the transmitter is configured to transmit the busy signal.

16. A device according to claim 15, wherein the signal sensing component is part of physical layer processing circuitry of the device.

17. A device according to claim 15, further comprising a decoding component, wherein the signal sensing component is configured to pass the message to the decoding component and to pass to the switch a signal indicating the receiving of the message.

18. A method according to claim 1, comprising forming a full duplex connection between the first device and the second device using a first channel and a second, different channel, such as to provide for transmission of first data from the second device to the first device over the first channel and for transmission of second data from the first device to the second device over the second channel, and further comprising transmitting of the busy signal by the first device over said same second channel used to transmit said second data.

* * * * *